(12) United States Patent
Günthner (10) Patent No.: US 9,920,808 B2
(45) Date of Patent: *Mar. 20, 2018

(54) MICROMECHANICAL SPRING (75) Inventor: Stefan Günthner, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 1428 days.

This patent is subject to a terminal disclaimer.

(21) Appl. No.: 12/677,133

(22) PCT Filed: Aug. 18, 2008

(86) PCT No.: PCT/EP2008/060801
§ 371 (c)(1),
(2), (4) Date: Mar. 9, 2010

(87) PCT Pub. No.: WO2009/033914
PCT Pub. Date: Mar. 19, 2009

(65) Prior Publication Data
US 2010/0194008 A1  Aug. 5, 2010

(30) Foreign Application Priority Data

Sep. 10, 2007  (DE) .................. 10 2007 042 683
Nov. 27, 2007  (DE) .................. 10 2007 057 044

(51) Int. Cl.
*F16F 1/02* (2006.01)
*F16F 1/18* (2006.01)

(52) U.S. Cl.
CPC .............. *F16F 1/025* (2013.01); *F16F 1/187* (2013.01)

(58) Field of Classification Search
CPC .... F16F 1/187; F16F 1/025; F16F 1/02; F16F 1/00; F16F 1/18; F16F 3/00
See application file for complete search history.

(56) References Cited

U.S. PATENT DOCUMENTS

| 5,409,200 A | 4/1995 | Zingher et al. |
| 5,487,305 A * | 1/1996 | Ristic et al. ............... 73/514.32 |
| 5,802,914 A * | 9/1998 | Fassler et al. ................. 74/110 |
| 6,170,332 B1 | 1/2001 | MacDonald |

(Continued)

FOREIGN PATENT DOCUMENTS

| DE | 197 19 601 | 11/1998 |
| DE | 199 20 066 | 11/2000 |

(Continued)

OTHER PUBLICATIONS

International Search Report for PCT/EP2008/060801 dated Nov. 27, 2008.
German Search Report for DE 10 2007 057 044.0 dated Apr. 29, 2008.

(Continued)

*Primary Examiner* — Xuan Lan Nguyen
(74) *Attorney, Agent, or Firm* — RatnerPrestia (57) ABSTRACT

A micromechanical spring including at least two bar sections which, in the undeflected state of the spring, are oriented substantially parallel to one another or are at an angle of less than 45° with respect to one another, and one or more connecting sections which connect the bar sections to one another, wherein the bar sections can be displaced relative to one another in their longitudinal direction, and wherein the spring has, in the direction of its bar sections, a substantially adjustable, in particular linear force-deflecting behavior.

13 Claims, 8 Drawing Sheets

(56) References Cited

U.S. PATENT DOCUMENTS

| | | | |
|---|---|---|---|
| 6,457,804 B1 | 10/2002 | Scholz et al. | |
| 6,536,282 B1 | 3/2003 | Kipp et al. | |
| 6,571,629 B1 | 6/2003 | Kipp et al. | |
| 6,595,503 B1 | 7/2003 | Cheng | |
| 6,776,041 B1 | 8/2004 | Hauer et al. | |
| 7,086,300 B1 | 8/2006 | Zacharie | |
| 2002/0011112 A1 | 1/2002 | Kipp et al. | |
| 2003/0036214 A1 | 2/2003 | Eskridge | |
| 2003/0172753 A1 | 9/2003 | Geen | |
| 2007/0103029 A1 | 5/2007 | Fedder | |
| 2010/0186507 A1* | 7/2010 | Gunthner et al. | 73/504.14 |

FOREIGN PATENT DOCUMENTS

| | | | |
|---|---|---|---|
| DE | 199 45 859 | 3/2001 | |
| DE | 199 60 604 | 6/2001 | |
| DE | 100 24 698 | 11/2001 | |
| EP | 0 458 406 | 11/1991 | |
| JP | 61 065925 | 4/1986 | |
| JP | 08-236787 | * 9/1996 | G02P 15/125 |
| WO | WO 99/64763 | 12/1999 | |
| WO | WO 2005/025381 | 3/2005 | |

OTHER PUBLICATIONS

Lutz, et al., "A Precision Yaw Rate Sensor in Silicon Micromachining." Transcurders 97, International Conference on Solid-State Sensors and Actuators, Chicago, Jun. 16-19, 1997.

Hopcroft, M.A. "The Young's Modulus of Silicon", IEEE Journal of Microelectromechanical Systems, vol. 19, Issue 2, 2010.

* cited by examiner

Fig. 1

PRIOR ART

Fig. 2

PRIOR ART

Fig. 3

PRIOR ART

Fig. 4

PRIOR ART

MICROMECHANICAL SPRING

CROSS REFERENCE TO RELATED APPLICATIONS

This application is the U.S. national phase application of PCT International Application No. PCT/EP2008/060801, filed Aug. 18, 2008, which claims priority to German Patent Application No. DE 10 2007 042 683.8, filed Sep. 10, 2007, and German Patent Application No. 10 2007 057 044.0, filed Nov. 27, 2007, the contents of such applications being incorporated herein by reference.

FIELD OF THE INVENTION

The invention relates to a micromechanical spring, to a method for manufacturing said spring from a semiconductor material and to the use of the micromechanical spring in micromechanical systems.

BACKGROUND OF THE INVENTION

It is known to use meandering micromechanical springs in order to achieve a, to some degree, linear deflection behavior of an oscillator such as, for example, same mass which is suspended from springs. However, meandering springs have in each case relatively large dimensions or a relatively large surface in the plane of the substrate, for which reason more substrate area is required and the springs have a relatively large mass compared to simple bar springs. Meandering springs also have the disadvantage that the linearity of their deflection behavior depends substantially on the number of their turns, as a result of which meandering springs with a particularly pronounced linear deflection behavior have the disadvantages described above to a greater degree.

SUMMARY OF THE INVENTION

An object of the present invention is to propose a micromechanical spring which has a substantially adjustable, in particular linear, deflection behavior within a defined deflection interval and which has, in particular, relatively small dimensions.

The invention relates to the idea of proposing a micromechanical spring comprising at least two bar sections which, in the undeflected state of the spring, are oriented substantially parallel to one another or are at an angle of less than 45° with respect to one another, and one or more connecting sections which connect the bar sections to one another, wherein the bar sections can be displaced relative to one another, and/or can be deflected relative to one another, in their longitudinal direction, and wherein the spring has, in the direction of its bar sections, a substantially adjustable, in particular linear force-deflecting behavior and/or a substantially constant spring stiffness within a defined deflection interval.

The invention relates, in particular, to a micromechanical spring comprising at least two bar sections which, in the undeflected state of the spring, are oriented substantially parallel to one another or are at an angle of less than 45° with respect to one another, and one or more connecting sections which connect the bar sections to one another, wherein the bar sections can be displaced relative to one another, and/or can be deflected relative to one another, in their longitudinal direction, and wherein the spring has a force-deflecting behavior with a negative nonlinearity coefficient of the second order of the spring stiffness, at least with respect to a deflection of its bar sections, which corresponds, in particular, to softening of the spring stiffness as the deflection increases. This is particularly advantageous for purposes of compensating the behavior of conventional springs which have increasing hardness as the deflection increases.

The micromechanical spring according to aspects of the invention has, compared to previously known micromechanical springs, the advantage that the deflection interval within which the spring has a substantially adjustable, in particular linear, deflection behavior, is relatively large and that the spring has relatively small dimensions in this context.

The micromechanical spring preferably has at least two bar sections which are arranged substantially directly opposite one another and are connected to one another by means of a connecting section.

A bar section differs from a connecting section in particular at least in that the bar section is significantly longer, particularly preferably at least twice as long, as the at least one adjoining connecting section, wherein these two sections can merge with one another, in particular in the form of at least one rounded portion.

The bar sections of meandering springs are not substantially displaced with respect to one another in their longitudinal direction in the course of a deflection.

The term deflection is expediently understood to refer to the deflection travel or the deflection distance.

A spring is preferably understood to be a spring system and/or an oscillator which comprises one or more spring segments or spring elements, and, in particular, additionally comprises one or more seismic masses. In this context, this spring or this micromechanical oscillator is particularly preferably deflectable at least substantially in the direction of its at least two bar sections, and has a substantially adjustable, in particular linear, deflection behavior in this direction.

A substantially linear deflection behavior of a spring is preferably understood to be a substantially linear relationship between the deflection travel and the restoring force, in particular a substantially constant spring stiffness.

The non-linearity coefficient of the second order of the spring stiffness, also simply referred to as non-linearity coefficient, is preferably understood to be the parameter or factor $\beta$ $[1/m^2]$ in the following equation of the normalized spring stiffness as a function of the deflection $x_0$:

$$\hat{k}(x_0) = (1 + \alpha x_0 + \beta x_0^2),$$

where the following relationships apply:

$$k(x_0) = k_0(1 + \alpha x_0 + \beta x_0^2), \; \hat{k}(x_0) = k(x_0)/k_0.$$

The spring stiffness is expediently equal to the quotient of the restoring force or of the deflection force divided by the deflection travel.

A substantially linear spring and/or a linear spring is preferably understood to be a micromechanical spring according to aspects of the invention and/or a possible developed embodiment.

The bar sections and connecting sections are preferably each rigidly connected to one another.

The spring system preferably couples two micromechanical elements to one another or is coupled at least to a substrate, wherein the spring system has, for the purpose of coupling, in each case a coupling region and/or a coupling element which comprises, in particular, at least one additional micromechanical spring element, wherein the at least one additional spring element is coupled in a substantially rigid fashion to the rest of the spring system. As a result, in particular the properties of a non-linear micromechanical spring element can be compensated. The spring system particularly preferably has one or more micromechanical spring elements with which said spring is coupled via a seismic mass. In this context, the entire spring system has a substantially adjustable, in particular linear, deflection behavior in the direction of the bar sections. Such an embodiment of the spring system permits the deflection properties or oscillation properties of a spring system, comprising a seismic mass, at least one, in particular three, simple spring elements, in particular bar spring elements, to be adjusted by means of an expedient embodiment of the bar sections and of the at least one connecting section. In this context, preferably substantially linear deflection properties and/or oscillation properties of the spring system are adjusted substantially in the direction of their bar sections. This design is particularly suitable for embodying an oscillator which is suspended from simple spring elements and has essentially unadjusted, in particular non-linear properties, by means of coupling or additional suspension by means of the bar sections and the at least one connecting section, to form an overall spring system whose deflection properties and/or oscillation properties can be substantially adjusted, in particular linearly.

Two or more micromechanical springs are alternatively preferably coupled to one another, in particular rigidly, by means of a seismic mass.

The fabrication parameters of the spring system, comprising preferably at least the spatial dimensions and/or the material parameters of the bar sections and of the at least one connecting section and, in particular, of the coupling regions and/or of the coupling elements, have, in particular in each case, values or are, in particular in each case, configured such that the spring system has, in the direction of its bar sections, a substantially adjustable and/or linear deflection behavior, at least within a defined deflection interval.

It is expedient that the bar sections and the connecting section or sections of the spring system is/are embodied and arranged so as to be substantially u-shaped or v-shaped or s-shaped in the undeflected state.

The substantially adjustable and/or linear deflection behavior of the spring system is preferably determined at least by the embodiment of the bar sections with defined lengths and widths and by the arrangement of the at least two bar sections at a defined distance from one another.

It is preferred for the spring system to be composed essentially of or fabricated essentially from monocrystalline silicon.

The crystal structure of the material of the micromechanical spring system is preferably oriented in such a way that the perpendicular to the plane of the crystal lattice is oriented at substantially 45° with respect to the perpendicular to the substrate from which the spring is fabricated. This corresponds in particular to Miller indices of <1,1,0>.

The absolute value of the nonlinearity coefficient of the second order of the spring stiffness of the spring element with respect to a deflection substantially in the direction of its bar sections is preferably less than 2 000 000 $1/m^2$, in particular less than 300 000 $1/m^2$.

It is preferred that the spring element has a negative nonlinearity coefficient of the second order of the spring stiffness with respect to its deflection or the deflection of at least one of its bar sections in the direction of the bar sections. This corresponds, in particular, to softening of the spring stiffness as the deflection increases, which can be advantageous for purposes of compensating the deflection behavior of conventional spring elements which have increasing hardness as the deflection increases.

The spring system has preferably at least one coupling element comprising at least one additional spring element, the spring stiffness of which changes within a defined deflection interval, wherein the entire spring system is embodied in such a way that this changing spring stiffness of the at least one additional spring element is compensated overall, and the spring stiffness of the entire spring system is substantially constant with respect to a deflection substantially in the direction of its bar sections within the defined deflection interval. As a result, it is particularly preferably possible to compensate the behavior of an additional spring element, which increases in stiffness as a function of the deflection, in that the spring segment composed of the at least two bar sections, which are substantially parallel or are at an angle of less than 45° with respect to one another, and the connecting sections which connect said bar sections, is configured with a behavior which decreases in stiffness with respect to the deflection, and the entire spring system therefore has a substantially linear deflection behavior within a relatively large, defined deflection interval.

In addition, the invention relates to a method for manufacturing the micromechanical spring from a semiconductor, in particular from monocrystalline silicon.

The invention also relates to the use of the micromechanical spring system in a micromechanical system, in particular in micromechanical sensors.

The micromechanical sensor according to aspects of the invention is provided for use in micromechanical systems, preferably in micromechanical sensors. The micromechanical spring system is particularly preferably provided for use in acceleration sensors because in such sensors a linear relationship between acceleration which acts on a mass suspended from springs and the deflection of the mass which is to be evaluated is desirable, for which purpose spring systems with a deflection behavior which is as linear as possible are appropriate. Alternatively, the use of the spring system according to aspects of the invention is preferably proposed in optical switches, in particular for permitting linear displacement travel of mirror actuators. In addition, it is particularly preferred to use the spring according to aspects of the invention in micromechanical resonators, in particular in vibration sensors. Furthermore, the use of the spring system according to aspects of the invention in micromechanical rotation rate sensors is preferred, in particular for suspending the seismic masses and particularly preferably for permitting linear deflections with respect to the primary mode or driving mode. As a result, quite particularly interference which is referred to as a quadrature, and which corresponds to an interference signal of the reading mode, which signal is usually produced by fabrication inaccuracies of the springs, can be avoided by the symmetrical suspension of the seismic mass from at least four springs according to aspects of the invention. In addition, relatively large, linear deflections in the driving mode can be implemented in a rotation rate sensor by using the spring according to aspects of the invention.

BRIEF DESCRIPTION OF THE DRAWINGS

The invention is best understood from the following detailed description when read in connection with the accompanying drawings. Included in the drawings are the following figures:

FIG. 3 shows the exemplary profile of the normalized spring stiffness $$\hat{k}(x_0) = k(x_0)/k_0$$

or a bar spring and of a meandering spring as a function of the deflection,

DETAILED DESCRIPTION OF THE PREFERRED EMBODIMENTS

Figure 1:
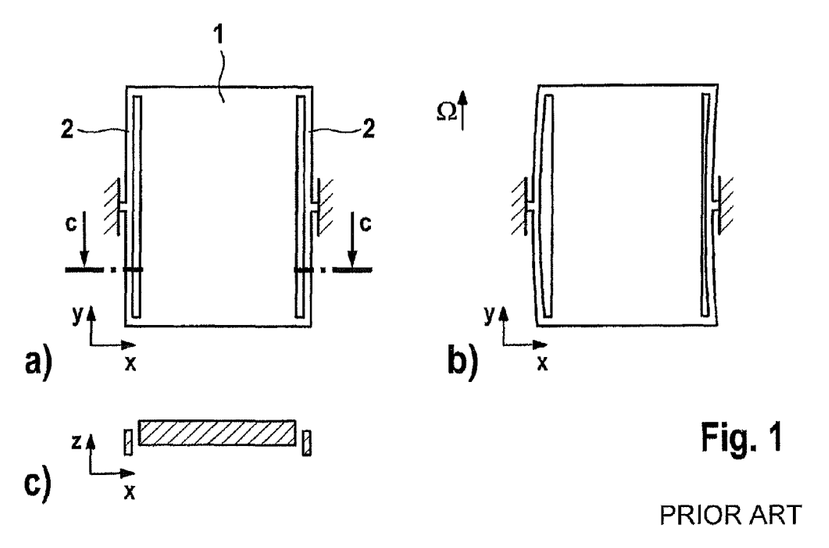
FIG. 1 shows an exemplary embodiment of a simple rotation rate sensor with bar springs.

FIG. 1 illustrates by way of example a simple rotation rate sensor with a seismic mass 1 which is suspended from two bar springs 2 on a substrate (not illustrated). FIG. 1b) illustrates the driving mode of the rotation rate sensor, which comprises deflections of the seismic mass 1 and of the bar springs 2. FIG. 1c) shows a section through FIG. 1a) in the x-z plane, wherein the seismic mass 1 is deflected in the z direction and oscillates, for example, in its reading mode. It is known that the illustrated, very simple spring geometry has a strong non-linear relationship between the deflection of the seismic mass 1 and the restoring force acting thereon. As the deflection increases, additional mechanical stresses occur, said stresses occurring due to the clamping-in conditions in the longitudinal direction of the bar and leading to hardening of the bar spring.

Figure 2:
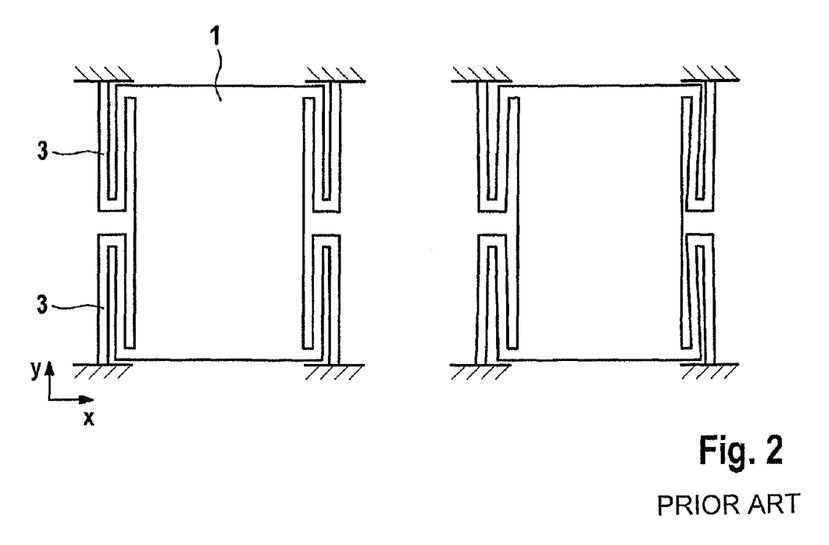
FIG. 2 shows an exemplary, simple rotation rate sensor with meandering springs.

FIG. 2 shows exemplary springs which have a meandering structure 3 and from which the seismic mass 1 of an exemplary, simple rotation rate sensor is suspended. The use of such meandering springs 3 reduces the dependence of the normalized spring stiffness $\hat{k}(x_0)$ on the deflection of the springs.

Figure 3:
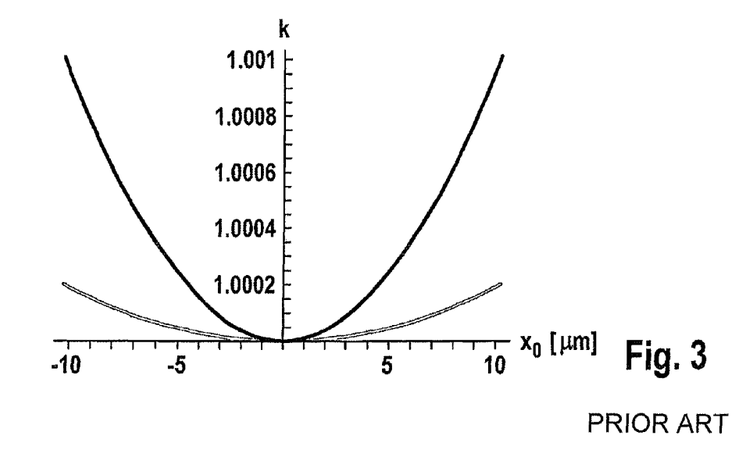

The black curve in FIG. 3 shows the typical exemplary behavior of a simple bar spring with respect to its normalized spring stiffness $$\hat{k}(x_0) = k(x_0)/k_0$$

as a function of a deflection in the x direction which is related to the limiting value of the spring stiffness $k_0$ for small deflections. The outline curve shows an exemplary typical profile of the normalized spring stiffness of an oscillator with meandering bar springs as a function of the deflection, which oscillator has the same primary frequency as the oscillator with the original bar geometries which is illustrated in FIG. 1.

Figure 4:
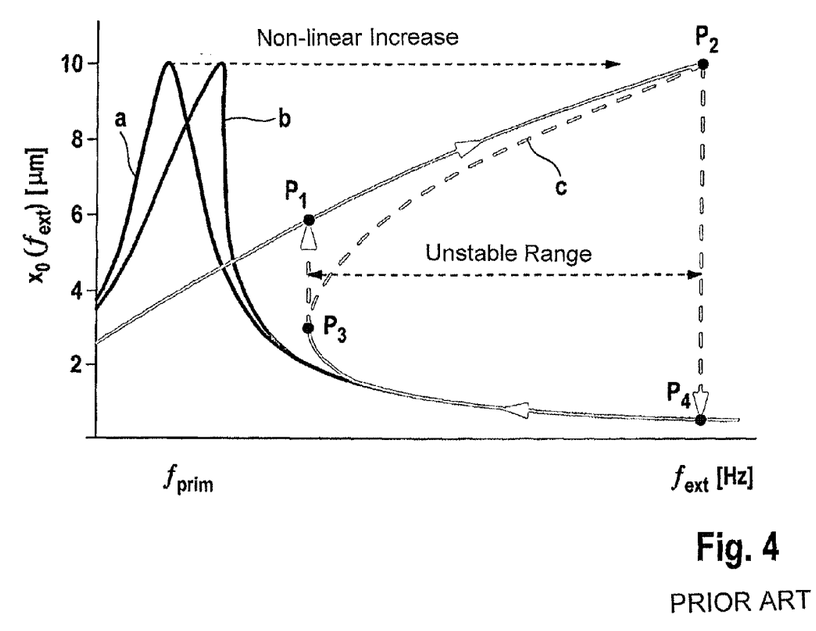
FIG. 4 shows exemplary amplitude responses $x_0(f_{ext})$ of the deflection of different non-linear oscillators.

The problem of such non-linear primary oscillators is that they can be deflected only up to a certain maximum amplitude before instabilities occur. FIG. 4 shows exemplary amplitude responses $x_0(f_{ext})$ of different non-linear oscillators. While the black curve a shows the well-known behavior of a linear, harmonically excited and damped harmonic oscillator with the natural frequency $f_{prim}$, as the non-linearity increases the curve b deviates from the ideal curve (shown in FIG. 4 as curve b) until regions occur (dashed) curve c in which there are bistable states with the result that for certain excitation frequencies $f_{ext}$ there are a plurality of stable oscillation states between which the system can jump due to minimum external interference. Such non-linear oscillators have a typical hysteresis behavior: starting from low excitation frequencies ($f_{ext}<f_{prim}$) the system passes through P1, P2 and P4, while starting from high excitation frequencies ($f_{ext}>f_{prim}$) the system passes through points P4, P3 and P1. In order, therefore, to design rotation rate sensors which operate in a stable way and which have a high amplitude and therefore a high rotation rate amplification, the spring elements which define the primary oscillation must be as linear as possible.

Figure 5:
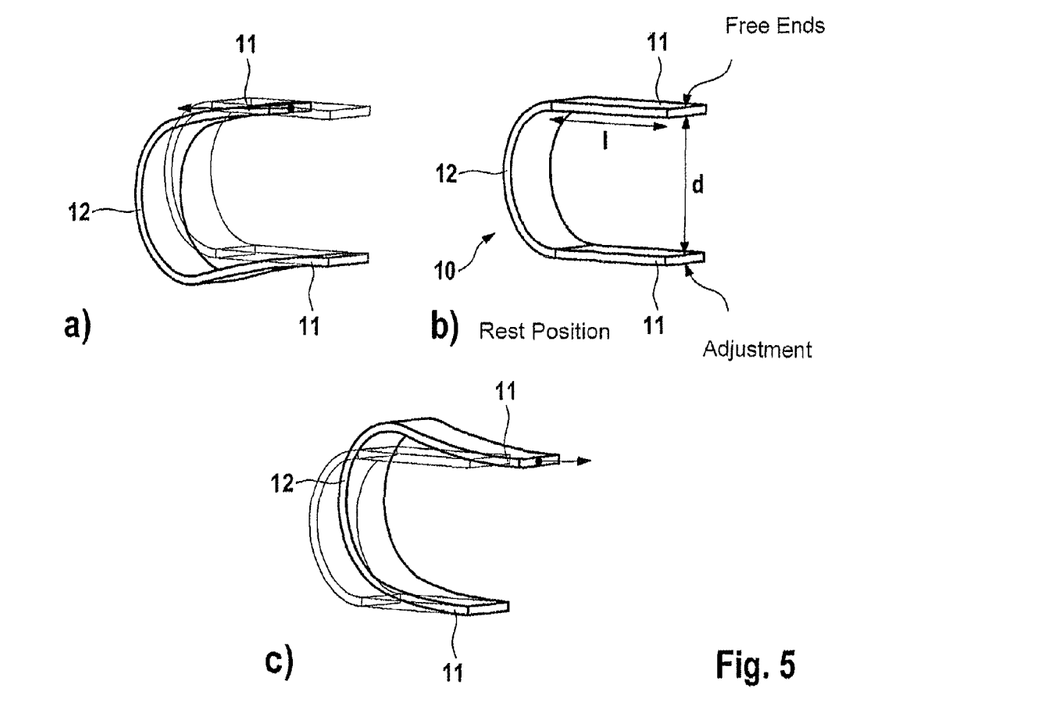
FIG. 5 shows a spring element which is embodied in an exemplary way, with a substantially linear deflection behavior.

FIG. 5 illustrates an exemplary spring element which has the advantage of being insensitive to certain process fluctuations which cause, in particular, undesired deflections (not illustrated) in the direction which is perpendicular to the actual, desired deflection. It has been found that the spring element 10, if suitably dimensioned, has the property of being linear in any desired way. The spring element 10 comprises, for example, two bar sections 11 which are substantially parallel to one another in the undeflected state, as illustrated in FIG. 5b), and which are connected via a connecting section 12. In the course of a deflection, as illustrated in FIGS. 5a) and c), bar sections 11 are displaced with respect to one another.

A further possible advantage is that the structure can be configured in such a way that, as the deflection increases, softening of the spring stiffness is brought about, instead of hardening of the spring stiffness occurring, as is known from conventional springs.

Calculations and measurements have shown that by adjusting the geometry of this exemplary spring element 10 it is possible to generate any desired, in particular linear, deflection behavior and also stiffness-reducing behavior.

Figure 6:
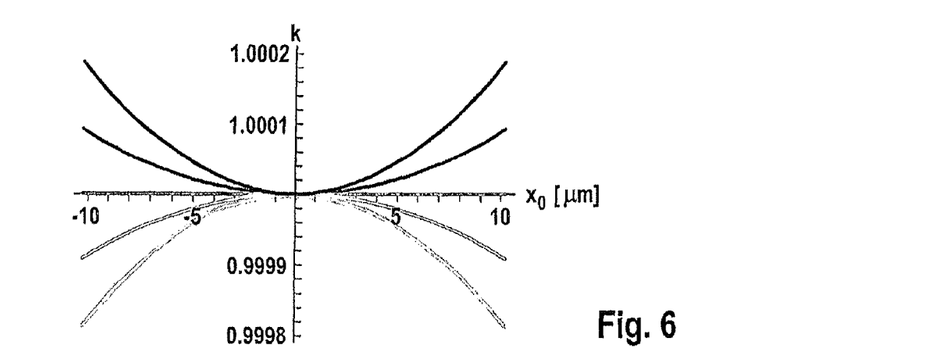
FIG. 6 shows different profile examples of the normalized spring stiffness as a function of the deflection for different embodiments of the substantially linear spring.

FIG. 6 shows, for different exemplary embodiments of the spring element 10, typical profiles of the normalized spring constant $\hat{k}(x_0)$ as a function of the deflection. If the normalized spring stiffness $\hat{k}(x_0)$ is approximated with the formula $\hat{k}(x_0)=1+\beta x_0^2$, it is possible to interpret β as being the degree of non-linearity. The greater the absolute value, the greater the degree by which the spring stiffness for large deflections deviates from the linear behavior. The sign of β ultimately indicates whether the spring stiffness becomes greater (+) or becomes weaker (−) as deflections increase.

Figure 7:
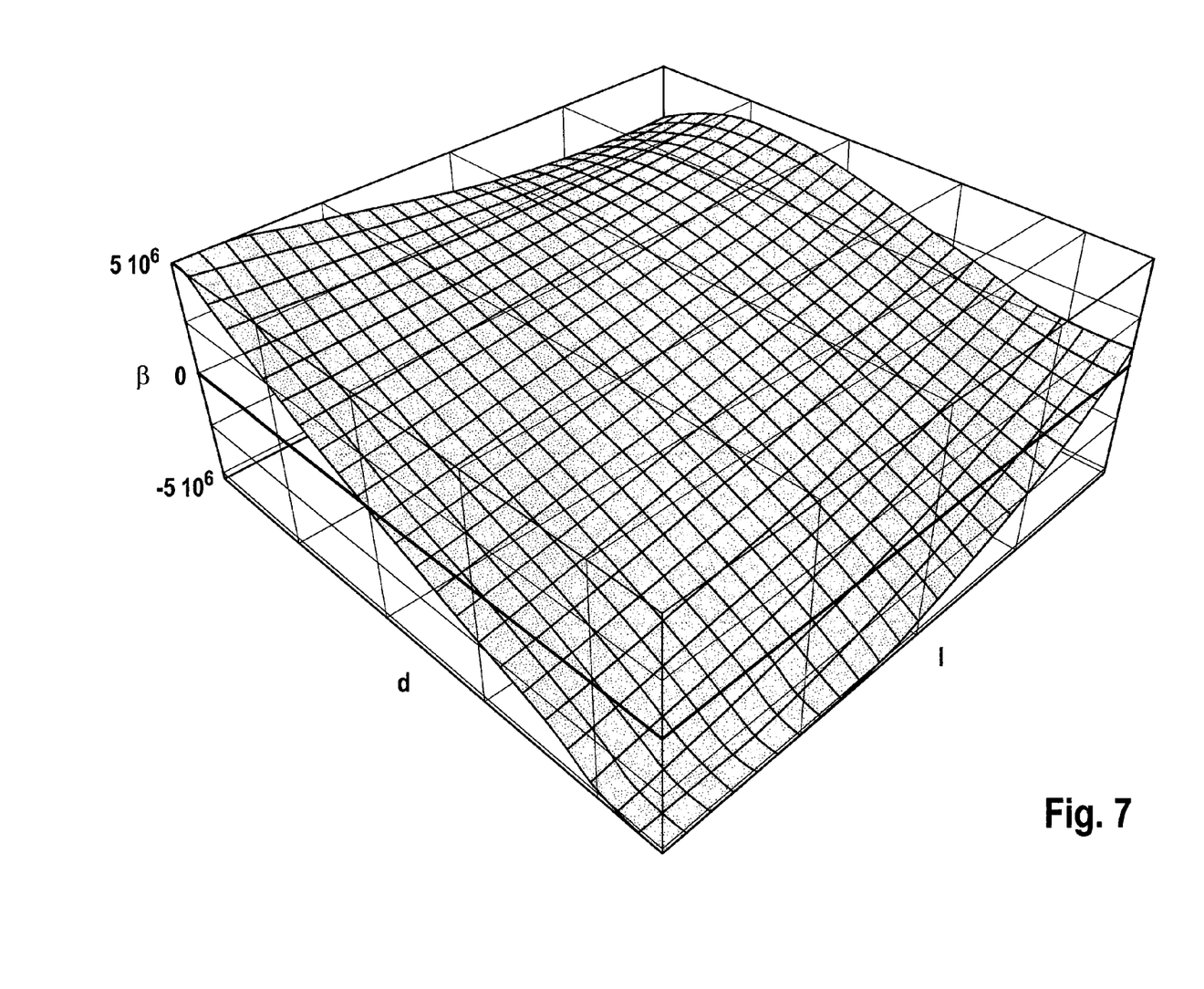
FIG. 7 shows the dependence of the non-linearity coefficient of the second order β of the spring constant of a spring exemplary embodiment on its dimensions d and l.

FIG. 7 illustrates by way of example the relationship between the dimensions d and l for a certain spring geometry, corresponding to the exemplary embodiment in FIG. 5, and the non-linearity coefficient β. In this context it has been ensured that the spring stiffness $k_0$ is identical for all combinations d and l. This therefore permits the non-linearity to be adjusted to a positive, negative or minimal setting for a desired spring stiffness, within certain peripheral conditions.

Figure 8:
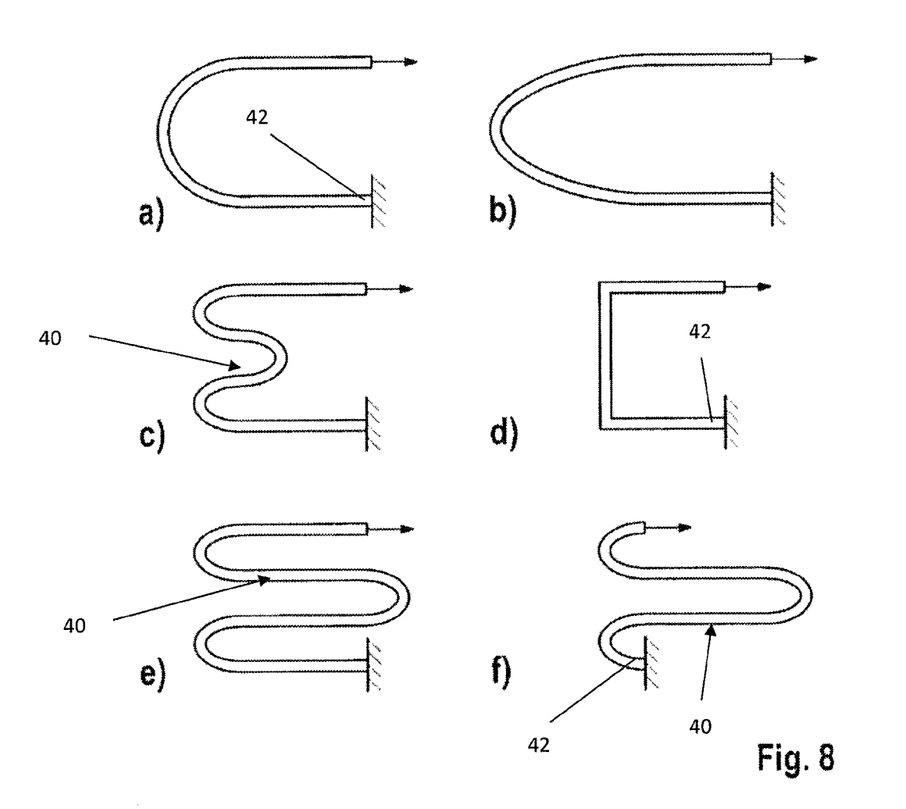
FIG. 8 shows a number of different exemplary embodiments of substantially linear micromechanical spring systems.

FIG. 8 shows a number of exemplary embodiments of substantially linear spring systems which differ from one another in terms of the number and embodiment of the bar sections, of the connecting sections and of the coupling regions 40 or coupling elements 42.

Figure 9:
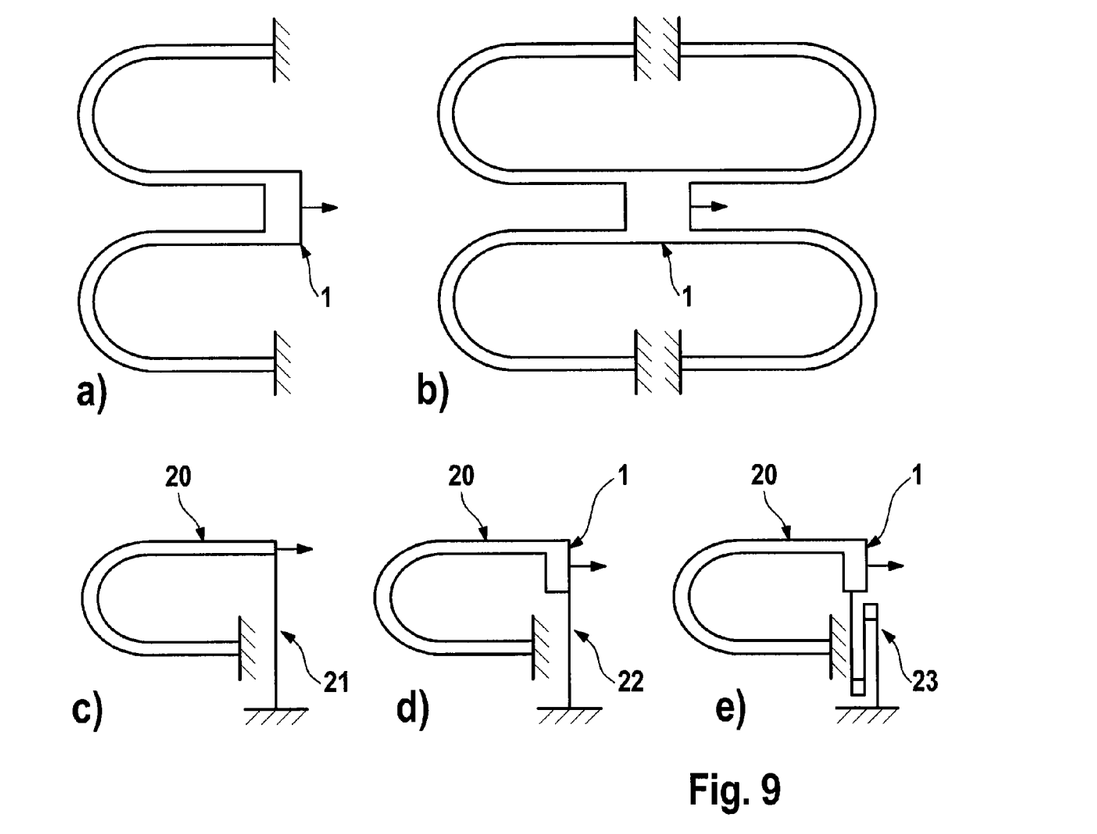
FIG. 9 shows exemplary embodiments of combined linear springs which are connected to one another, and exemplary embodiments of combinations of linear springs with additional coupling elements and/or an additional spring element.

FIGS. 9a) and b) illustrate exemplary embodiments in which a plurality of substantially linear springs are firmly and rigidly connected to one another, for example by means of the seismic mass 1, and can be correspondingly used in combination. FIGS. 9c) to e) show exemplary embodiments with coupling elements. Here, combinations of individual linear springs with conventional bar springs 21, 22 are illustrated in FIGS. 9c) and d), the free ends of which are rigidly connected to one another, and are illustrated with an additional, differently oriented non-linear spring 23 in FIG. 9e).

Here, the rigid connection in FIG. 9d) and that in FIG. 9e) respectively comprise a seismic mass 1. For example, the stiffness in the deflection direction is primarily provided by the substantially linear springs 20.

Figure 10:
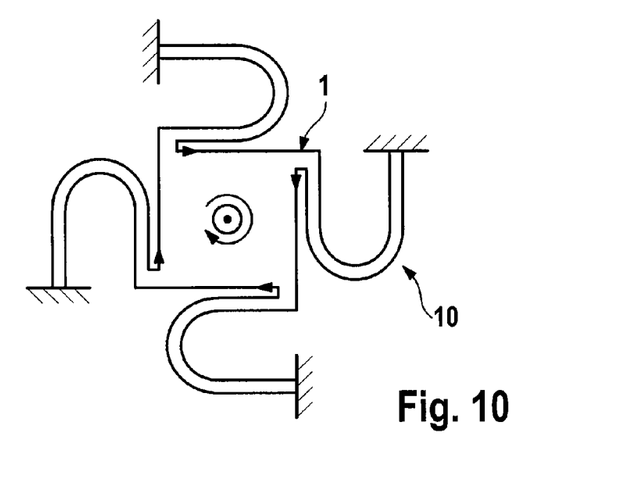
FIG. 10 shows an exemplary embodiment of the implementation of a rotary oscillation system with four linear springs.

FIG. 10 illustrates, for example, a seismic mass 1 which is suspended from four linear springs 10 and can therefore be deflected, for example, substantially linearly or rotationally.

Figure 11:
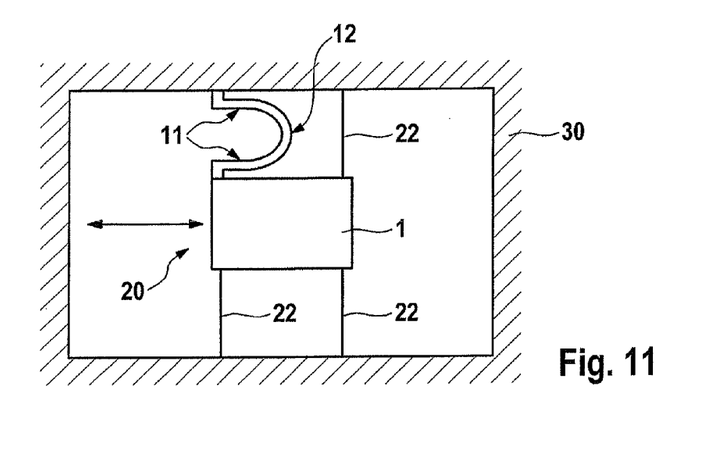
FIG. 11 shows a micromechanical spring which comprises 3 additional spring elements which are coupled via a seismic mass.

FIG. 11 is an exemplary embodiment of a micromechanical spring system, depicted as a linear spring 20, which is at the same time an oscillator and comprises the seismic mass 1 and bar spring elements 22, and is suspended from the substrate 30. The linear properties of the linear spring 20 are based substantially on the exemplary embodiment of the bar sections 11 and of the connecting section 12 with which the non-linear deflection properties of the bar spring elements 22 are compensated in the direction of the bar sections.

In the text which follows, exemplary methods for implementing and/or developing linear springs as shown above and/or for developing micromechanical springs with an adjustable deflection behavior are described:

Method by Means of Finite Elements:

The method of finite elements provides the possibility of describing in a computer-supported fashion spring properties of a bar arrangement composed of a certain material whose elastic properties are known. It is possible, for example, to describe the spring stiffness values in all the spatial directions and/or about all the spatial axes. For this purpose, the position of the spring system, which corresponds to an end of the spring system which is held in a secured fashion or clamped in, is provided with a corresponding peripheral condition, and the position which corresponds to an end which is held in a free or deflectable fashion, is deflected by way of example by a specific amount in a spatial direction or about a spatial axis. From the result of the analysis, for example by determining the reaction force acting on the deflection travel, the stiffness of the spring can be calculated. In order to determine the spring stiffness, it is also possible to use other known methods such as, for example, the effect of a force on the free end or of an acceleration on a suspended mass. In addition, for example non-linear material properties and geometric non-linearities can be depicted completely in the finite element analysis. It is therefore possible, with given dimensions of a material arrangement, to determine the deflection-dependent spring stiffness and therefore the linearity behavior. In the text which follows, a method is described with which the desired deflection behavior can be achieved and/or adjusted.

At first, one or more certain embodiments of a spring system are selected, and the following investigations are carried out for each individual embodiment. After the analysis of the individual investigations, it is possible to decide on the optimum spring embodiment.

For a spring embodiment, the dimensions which can be varied are then selected. If n free geometry parameters $\xi_1$ (i=1 . . . n), which are represented by the vector $\vec{\xi}=(\xi_1, \xi_2, \ldots \xi_n)$ are available, an n-dimensional parameter field is created as a result. Typically, certain restrictions apply to the parameters $\xi_i$ in terms of the values which they can assume. Said values can lie, for example, within an interval having the limiting values $a_{\xi_i}$ and $b_{\xi_i}$: $\xi_i \in \lfloor a_{\xi_i}; b_{\xi_i} \rfloor$.

Finally, a number of $m_i$ values which lie within the range $\lfloor a_{\xi_i}; b_{\xi_i} \rfloor$ are selected for each geometry parameter $\xi_i$: $\xi_{i,1}$, $\xi_{i,2}, \ldots \xi_{i,m_i}$. This results in a set of $$\prod_{i=1}^{n} m_i$$

of different parameter vectors $(\xi_{1,j_1}, \xi_{2,j_2}, \ldots \xi_{n,j_n})$ where $j_i \in [1, 2, \ldots m_i]$. For each possible combination of $(j_1, j_2, \ldots j_n)$ there is an associated parameter set $(\xi_{1,j_1}, \xi_{2,j_2}, \ldots \xi_{n,j_n})$ to which a certain set of geometrical dimensions corresponds. For each individual set of geometrical dimensions it is then possible to carry out the desired simulations. In order to determine the deflection behavior, at least three simulations, for example, are necessary for this, in which simulations the free end is displaced by at least three different values $x_1, x_2, \ldots x_p$ (p≥3) in the desired deflection direction. The result is at least three reaction forces acting on the deflected free end counter to the deflection direction: $F(x_1), F(x_2), \ldots F(x_p)$.

From these it is possible to calculate the spring stiffness values $$K(x_q) = F(x_q)/x_q$$

where $q \in [1, 2, \ldots p]$. The parameters $k_0$, α and β of the function $k(x_0)=k_0(1+\alpha x_0+\beta x_0^2)$ can then be determined in such a way that the spring constants $K(x_q)$ are approximated by $K(x_q)$, for example according to the principle of the least mean square error. The linear spring constant $k_0$ and the non-linearity coefficient β are therefore obtained for each parameter set $(\xi_{1,j_1}, \xi_{2,j_2}, \ldots \xi_{n,j_n})$.

If the non-linearity coefficient β has then been determined for all the parameter sets of all the spring embodiments, the parameter sets and/or spring embodiments which have the desired properties in terms of the stiffness and the non-linearity coefficient β etc. can be selected.

Method of Analytical Modeling:

If one restricts themselves to simple bar geometries, it is possible to design an analytical model according to the bar theory which describes the desired properties. The adjustment of the non-linearity coefficient can be done by parameter optimization of the geometry dimensions within the analytical model.

Experimental Selection:

A further possibility is experimental investigation of variants of selected spring concepts. For example, it is possible to investigate oscillators with masses which are suspended from the spring elements to be investigated. It is possible to draw conclusions about the non-linearity coefficient from this. However, owing to the expenditure on production and measurement it is only possible to analyze relatively small sets of dimensions in this way.

In the text which follows, an exemplary micromechanical linear spring will be described in more detail and compared with a conventional micromechanical meandering spring with optimized linearity. The peripheral conditions adopted are:

(A) The structural height h is 100 µm.
(B) The material used is monocrystalline silicon, wherein the coordinate system, which is given by the crystal directions, is rotated through 45 degrees about the wafer perpendicular with respect to the coordinate system of the element.
(C) The spring stiffness in the deflection direction is intended to be 400 $Nm^{-1}$. If a mass of 2 µg is held by two springs, a natural frequency in the deflection direction of 20 kHz occurs.

Figure 12:
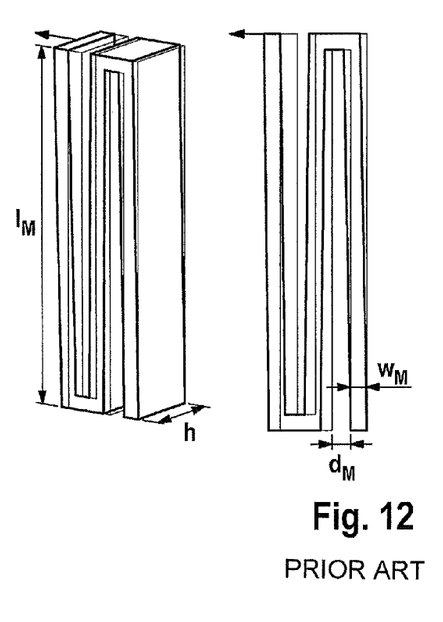
FIG. 12 shows an exemplary meandering spring for direct comparison with an exemplary linear spring shown in FIG. 13.

A conventional meandering spring having the dimensions $l_M$=436 µm, $w_M$=18 µm and $d_M$=20 µm has a spring stiffness of 400 $Nm^{-1}$. The silicon surface occupied by the meandering structure is 0.024 $mm^2$. FIG. 12 shows this exemplary meandering spring.

Figure 13:
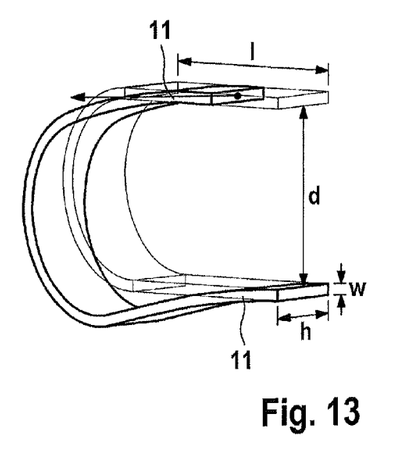
FIG. 13 shows an exemplary linear spring.

FIG. 13 shows, for the purpose of comparison, an exemplary, substantially linear spring having the dimensions l=250 µm, which corresponds substantially to the length of the two bar sections 11, the width w=15.3 µm, and the distance between the two bar sections d=250 µm, wherein this spring also has a stiffness of 400 $Nm^{-1}$. By virtue of the above-described method of finite elements, the dimensions were selected such that the non-linearity coefficient β is as small as possible. The silicon area which is occupied by the spring structure is only 0.014 $mm^2$ here.

Figure 14:
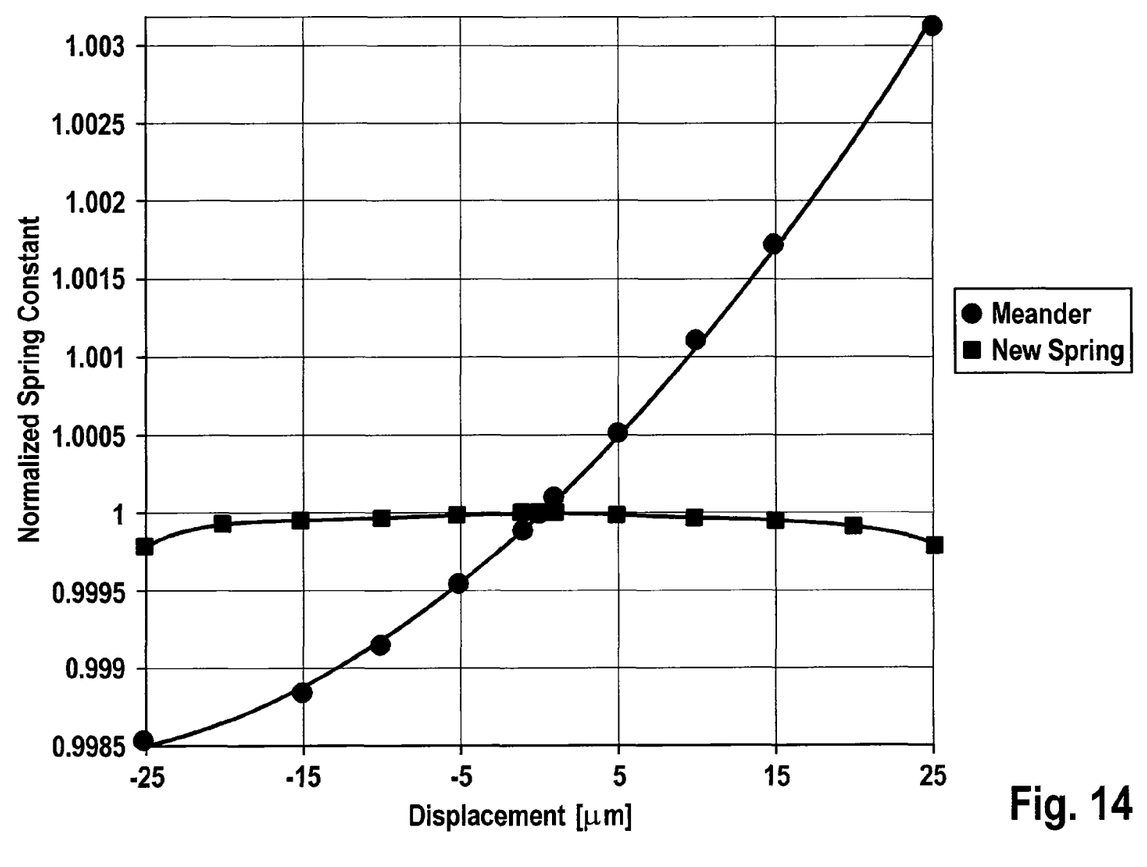
FIG. 14 shows the comparative profiles of the normalized spring stiffnesses as a function of the deflection of these two exemplary embodiments.

The different linearity behavior of these two different springs from FIGS. 12 and 13 is illustrated in FIG. 14. Here, the normalized spring constant $\hat{k}(x_0)$ in the deflection direction was plotted against the deflection. While the meandering spring has a non-linearity coefficient of 1.3 $10^6$ in the deflection region illustrated, the non-linearity coefficient of the new spring structure is smaller in absolute terms than 300 000. In particular, in the new spring structure illustrated, the non-linearity coefficient is negative, with the result that spring-stiffening non-linearities occurring due to additional effects could be compensated. An oscillator with the meandering structure can be operated only up to approximately 9 µm amplitude without instability regions, but with the novel spring structure stable oscillations up to amplitudes of 23 µm are possible. In addition, the area for the meandering structure is significantly larger compared to the area required for the exemplary linear spring.

The invention claimed is:

1. A micromechanical spring system comprising:
at least two bar sections which, in an undeflected state of the spring, are oriented substantially parallel to one another or are oriented at an angle of less than 45° with respect to one another, and
at least one connecting section which connects the bar sections to one another,
wherein the bar sections are configured to be displaced relative to one another in their longitudinal direction, and
wherein a spring stiffness of the micromechanical spring system is substantially constant throughout a deflection range of one of the bar sections and wherein the dimensions of the micromechanical spring are selected to ensure constant spring stiffness throughout the deflection range of the bar section.

2. The spring system as claimed in claim 1, wherein the micromechanical spring is coupled to at least one micromechanical spring element or is coupled at least to a substrate, and has, for a purpose of coupling, in each case a coupling region or at least one coupling element which comprises the at least one micromechanical spring element, wherein the micromechanical spring element is coupled in a substantially rigid fashion to the spring.

3. The spring system as claimed in claim 1, wherein the micromechanical spring is coupled to one or more micromechanical spring elements via a seismic mass, and the micromechanical spring system has a substantially adjustable deflection behavior in a direction of the bar sections.

4. The spring system as claimed in claim 1, wherein fabrication parameters of the spring, comprising at least spatial dimensions (d,l,w) have values such that the spring has, in a direction of the bar sections, a substantially adjustable deflection behavior, at least within a defined deflection interval.

5. The spring system as claimed in claim 1, wherein a set of parameters comprising a length of the bar sections (l), a distance between the bar sections (d) and a length of the at least one connecting section and of at least one coupling region or of at least one coupling element have values such that the spring has, in a direction of the bar sections, a deflection behavior particular to no more than one of the parameters, at least within a defined deflection interval.

6. The spring system as claimed in claim 1, wherein the bar sections and the at least one connecting section of the spring are embodied and arranged so as to be substantially u-shaped or v-shaped or s-shaped in the undeflected state.

7. The spring system as claimed in claim 1, wherein the substantially adjustable deflection behavior of the spring is determined at least by an embodiment of the bar sections with defined lengths (l) and widths (w) and by an arrangement of the at least two bar sections at a defined distance (d) from one another.

8. The spring system as claimed in claim 1, wherein said spring is composed substantially of monocrystalline silicon.

9. The spring system as claimed in claim 1, wherein each bar section comprises a non-linearity of a second order and wherein an absolute value of the second order non-linearity coefficient (β) of spring stiffness with respect to a deflection substantially in a direction of the bar sections is less than 2,000,000 $1/m^2$.

10. The spring system as claimed in claim 9, wherein the absolute value of the second order non-linearity coefficient (β) of spring stiffness with respect to the deflection substantially in a direction of the bar sections is less than 300,000 $1/m^2$.

11. A micromechanical spring system comprising:
at least two bar sections which, in an undeflected state of the spring, are oriented substantially parallel to one another or are oriented at an angle of less than 45° with respect to one another, and at least one connecting section which connects the bar sections to one another, wherein the bar sections are configured to be displaced relative to one another in their longitudinal direction, wherein a spring stiffness of the micromechanical spring is substantially constant with respect to a deflection substantially in a direction of the bar sections within a defined deflection interval, and wherein said spring has a negative second order non-linearity coefficient of spring stiffness with respect to the deflection or the deflection of at least one of the bar sections in the direction of the bar sections.

12. The spring system as claimed in claim 1, wherein said spring has at least one coupling element comprising at least one spring element, a spring stiffness of the at least one spring element changes within the defined deflection interval, wherein the entire spring is embodied in such a way that the changing spring stiffness of the at least one spring element is compensated overall.

13. The spring system as claimed in claim 1, wherein force-deflecting behavior is linear.

* * * * *